Dec. 31, 1963     A. F. SPRANGER     3,116,092
SEAT BELT CONSTRUCTION
Filed March 29, 1962
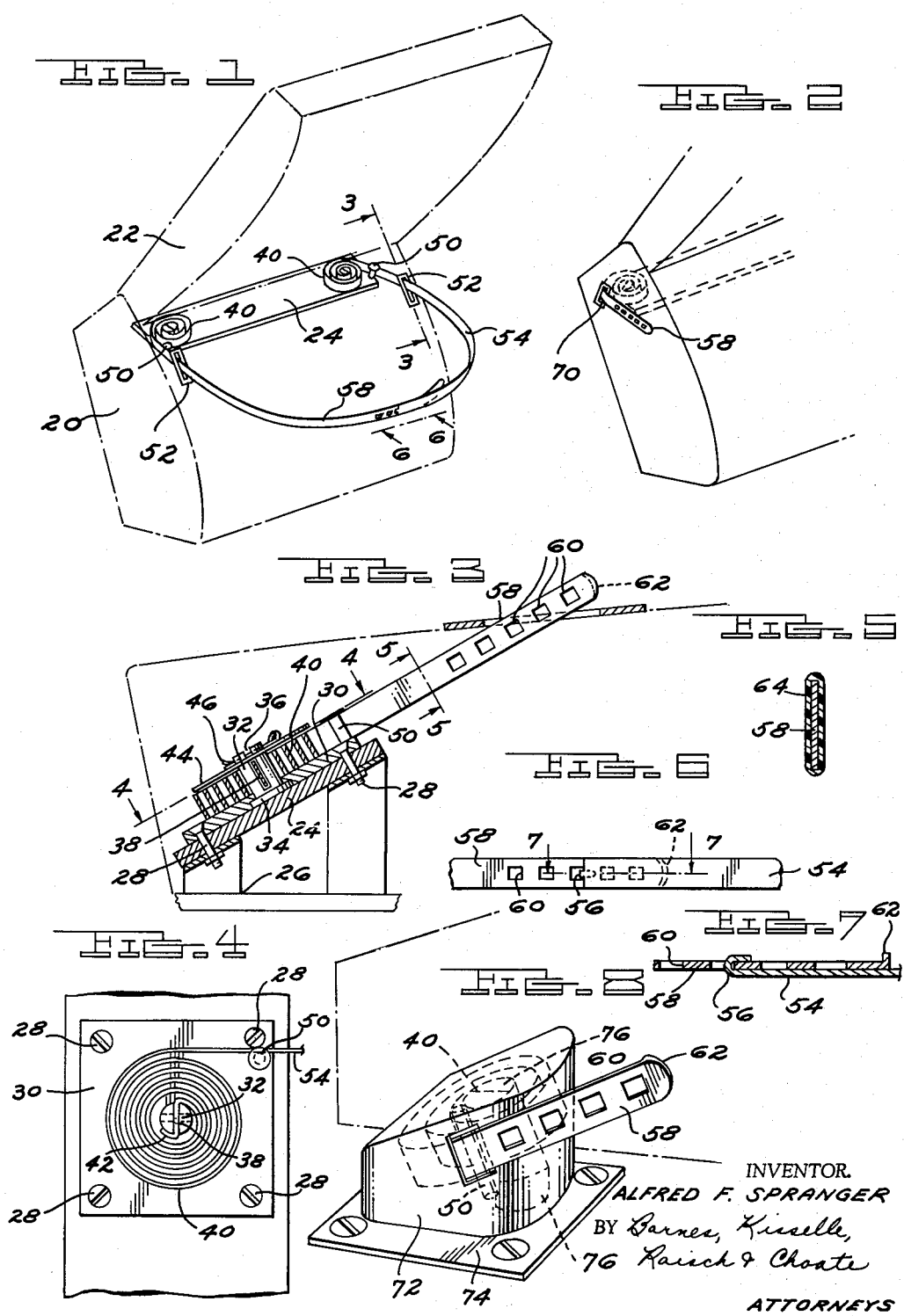
INVENTOR.
ALFRED F. SPRANGER
BY Barnes, Kisselle,
Raisch & Choate
ATTORNEYS

United States Patent Office 3,116,092
Patented Dec. 31, 1963

3,116,092
SEAT BELT CONSTRUCTION
Alfred F. Spranger, P.O. Box 191, East Detroit, Mich.
Filed Mar. 29, 1962, Ser. No. 183,655
4 Claims. (Cl. 297—388)

This invention relates to a seat belt construction such as are used in airplanes and vehicles.

Certain safety investigations have indicated that seat belts are extremely valuable for the preservation of life, whether used in airplanes or passenger or commercial vehicles. The use of these belts is increasing in passenger cars, but the belts as presently used are sometimes inconvenient and bothersome because of the nature of the belt and the anchoring mechanism.

It is an object of the present invention to provide an improved retractable seat belt which is readily available for use and can be reached at a single location at all times so that a passenger knows exactly where to find the opposed ends of the belt so that he may draw it over his lap and fasten it. Retractable seat belts, that is, belts which wind up, have been disclosed in prior patents such as Franz 2,488,858, dated November 22, 1949 and Hoven 2,843,335, dated July 15, 1958.

It is an object of the present invention to provide an improved seat belt which is inexpensive from the point of view of manufacture and installation, and which can be readily anchored to the seat or the frame of the vehicle.

It is another object of the present invention to provide a retractive seat belt which has an added safety factor in that it is formed of metal throughout so that it has a maximum tensile strength while yet being comfortable and readily retractable without the necessity for the spring-controlled reel which is sometimes used.

It is a further object of the invention to provide an improved retractable seat belt with an adjustable fastening device but so arranged that the ends of the belt retract out of the way when the belt is not in use.

It is a further object to provide an improved seat belt which has a solid metal core which is covered with a softer material to provide comfort and an attractive appearance.

Other objects and features of the invention relating to details of construction and operation will be apparent in the following description and claims.

Drawings accompany the disclosure and the various views thereof may be briefly described as:

FIGURE 1, a perspective view of a seat shown from an upward angle position to illustrate the positioning of the seat belt.

FIGURE 2, a view of a seat showing a modified location for the belt.

FIGURE 3, a sectional view on line 3—3 of FIGURE 1.

FIGURE 4, a sectional view on line 4—4 of FIGURE 3.

FIGURE 5, a sectional view of the belt on line 5—5 of FIGURE 3.

FIGURE 6, a close-up view of the fastened belt on line 6—6 of FIGURE 1.

FIGURE 7, a sectional view of the belt on line 7—7 of FIGURE 6.

FIGURE 8, a view of a modified belt anchor which can be placed directly on the floor or frame of the vehicle adjacent the seat.

Referring to the drawings:

A cushion seat 20 having a back 22 is shown. This can be either an airplane seat or a vehicle seat for a passenger or commercial vehicle. Toward the rear of the seat portion is a mounting panel 24 positioned at an angle and fastened directly to the frame 26 of the seat by bolts 28. On this plate 24 are smaller mounting plates 30 preferably of metal which are retained by bolts 28 to the plate 24.

Extending through a central opening in the plate 30 is a mounting stud 32 which has a flange 34 recessed into a countersink in the bottom of plate 30 so that the mounting stud on post 32 is backed up by the plate 24 and securely retained by the plate 30. This stud is preferably provided with a diametrical split 36 which receives a stationary end 38 of a coiled-spring 40. The spring 40 is coiled as shown in FIGURE 4 in an open coil when retracted so that there is a space between each of the convolutions.

The spring is retained on the post 32 by an overlying washer 44 held in place by a cotter pin 46. Mounted at the corners of the plates 30 are roller guides 50 in an upright position on the plates 30 to serve as a friction-reducing device for the retractable seat belt and to serve also to guide the coil into and out of its position. The operating end of the seat belt projects away from the coil and in FIGURE 1 extends through a metal grommet 52 which provides a slot in the top surface of the seat. The operating end 54, shown in FIGURE 1, is provided with a latching hook 56. The operating end 58 in FIGURE 1 is provided with a plurality of openings 60 for receiving the fastening hook 56 and also is provided with a downwardly turned tab 62.

The hook 56 and the tab 62 prevent the ends 54 and 58 from reaching irretrievable positions below the surface of the seat. The coil from which the seat belt is formed is preferably a spring steel of high quality having a conventional width approximately 1¼" or 1½" in the lateral dimension. The coiled material is preferably coated with a soft material 64 (FIGURE 5) such as a fabric which has a fairly slippery "feel" and which is also relatively soft to the touch. The fabric 64 can be woven in a tubular form and slipped over the coil spring before it is positioned for use. The coating material 64 can also be a dipped or sprayed plastic of flexible nature which provides a soft and smooth feel.

In FIGURE 2, a modified construction is shown wherein the belt is mounted in substantially the same way as described with respect to FIGURES 1 and 3 with the exception that guide grommet 70 is in the side of the seat down near the base corner rather than on the upper surface of the seat.

In FIGURE 8, a further modification is shown wherein an independently mountable housing 72 has a mounting plate 74. Mounted at an angle in the housing is a mounting post 76 similar to that shown in FIGURE 3 and around this post is the coiled and coated seat belt 40.

In the operation of the device, it will be seen that the passenger may occupy the seat and simply reach down to the grommets 52 to find the projecting ends of the seat belt. These may be pulled out and in doing so the coil tightens on itself as it rolls along the guide rollers 50. At the extreme outward position, the coil 40 is tight around the post, but the seat belt ends 54 and 58 have been drawn far enough to pass around the abdomen of a passenger where they can be fastened suitably by the hook and recess combination 56, 60 or a conventional seat belt buckle can be used as desired. Upon release of the seat belt when the passenger desires to leave the seat, the coil 40 will retract the seat belt ends until the retraction is blocked at the guide grommets 52 or 70 and the belt is in storage position until it is desired to use it again.

It will thus be seen that I have disclosed a seat belt which has a simple construction with a solid anchoring means which cannot be dislodged and wherein the retractable spring characteristic of the seat belt itself causes the retraction without the need of a separately actuated roller. In addition, the belt is strong, being formed with the solid metal core, and it is comfortable because of the sheathing on the outside surfaces thereof. Another feature of the invention is that the retraction action is relatively slow and thus the ends of the belt do not whip when released. In addition, the belt can be fastened with some slack and yet will remain firmly around the waist while permitting comfortable shifting in the seat.

I claim:

1. A retractable safety belt assembly for use with a seat assembly comprising at least one support fixed adjacent said seat assembly generally rearwardly of the passenger space of said seat, a spring coil extendable into an elongate, self-retractable, substantially flat spring strip to serve as a safety belt, means attaching one end of said coil to said support whereby the other end of said coil may be drawn from the coil so that said strip is in a relatively taut position and stressed condition around a person in said seat assembly, said strip being retractable upon release to the coil at said support by its inherent resilience, and means for coupling the other end of said strip to at least one support adjacent and generally rearwardly of the passenger space.

2. A retractable safety belt assembly for use with a seat assembly comprising at least one support fixed adjacent said seat assembly generally rearwardly of the passenger space of said seat, a spring coil extendable into an elongate, self-retractable, substantially flat spring strip to serve as a safety belt, means attaching one end of said coil to said support whereby the other end of said coil may be drawn from the coil so that said strip is in a relatively taut position and stressed condition around a person in said seat assembly, said strip being retractable upon release to the coil at said support by its inherent resilience, a tubular, flexible, relatively soft and smooth material surrounding and enclosing said strip and fixed at said support with said strip, and means for coupling the other end of said strip to at least one support adjacent and generally rearwardly of the passenger space.

3. A retractable safety belt assembly for use with a seat assembly comprising at least one support fixed adjacent said seat assembly generally rearwardly of the passenger space of said seat, a spring coil extendable into an elongate, self-retractable, substantially flat spring strip to serve as a safety belt, means attaching one end of said coil to said support whereby the other end of said coil may be drawn from the coil so that said strip is in a relatively taut position and stressed condition around a person in said seat assembly, said strip being retractable upon release to the coil at said support by its inherent resilience, a coating on said strip of material having a relatively soft and smooth feel, and means for coupling the other end of said strip to at least one support adjacent and generally rearwardly of the passenger space.

4. A retractable safety belt assembly for use with a seat assembly comprising at least one support fixed adjacent said seat assembly generally rearwardly of the passenger space of said seat, a spring coil extendable into an elongate, self-retractable, substantially flat spring strip to serve as a safety belt, means attaching one end of said coil to said support whereby the other end of said coil may be drawn from the coil so that a portion of the coil adjacent the end attached to the support is coiled tightly at said support in a snubbing relationship and the remainder of the strip is in a relatively taut position and stressed condition around a person in said seat assembly, said strip being retractable upon release to the coil at said support by its inherent resilience, and means for coupling the other end of said strip to at least one support adjacent and generally rearwardly of the passenger space.

References Cited in the file of this patent

UNITED STATES PATENTS

| 1,676,596 | Wittel | July 10, 1928 |
| 1,964,280 | Witchger | June 26, 1934 |
| 2,071,903 | Shively | Feb. 23, 1937 |
| 2,434,119 | Nordmark | Jan. 6, 1948 |
| 2,690,985 | Poole | Oct. 5, 1954 |
| 2,937,882 | Oppenheim | May 24, 1960 |
| 2,979,417 | Kruger | Apr. 11, 1961 |
| 3,020,089 | Monroe | Feb. 6, 1962 |
| 3,032,374 | Robinson | May 1, 1962 |

FOREIGN PATENTS

| 820,770 | Great Britain | Sept. 23, 1959 |